(12) United States Patent
Kolesnikov et al.

(10) Patent No.: US 9,509,665 B2
(45) Date of Patent: Nov. 29, 2016

(54) PROTECTING AGAINST MALICIOUS MODIFICATION IN CRYPTOGRAPHIC OPERATIONS

(71) Applicant: Alcatel-Lucent USA Inc., Murray Hill, NJ (US)

(72) Inventors: Vladimir Y. Kolesnikov, Jersey City, NJ (US); Abishek Kumarasubramanian, Los Angeles, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 37 days.

(21) Appl. No.: 14/456,554

(22) Filed: Aug. 11, 2014

(65) Prior Publication Data

US 2016/0044031 A1    Feb. 11, 2016

(51) Int. Cl.
*H04L 29/06*  (2006.01)
*H04L 9/32*   (2006.01)
*H04L 9/06*   (2006.01)

(52) U.S. Cl.
CPC .......... *H04L 63/0428* (2013.01); *H04L 9/0643* (2013.01); *H04L 9/3218* (2013.01); *H04L 9/3242* (2013.01); *H04L 63/0876* (2013.01); *H04L 63/123* (2013.01)

(58) Field of Classification Search
CPC .......... H04L 63/0869; H04L 63/0428; H04L 9/3281; H04L 9/3223; H04L 9/3242; H04L 63/083; H04L 9/3218; H04L 63/0876; H04L 63/123; H04L 9/0643; G06F 21/64; G06F 21/6245
See application file for complete search history.

(56) References Cited

U.S. PATENT DOCUMENTS

| | | | | |
|---|---|---|---|---|
| 5,214,698 A * | 5/1993 | Smith, Sr. | ............... | H04L 9/088 380/277 |
| 6,606,393 B1 * | 8/2003 | Xie | ........................ | G06T 1/0028 380/210 |
| 7,080,249 B1 * | 7/2006 | Jakubowski | .......... | G06F 21/125 713/165 |

(Continued)

OTHER PUBLICATIONS

Rosario Gennaro, Craig Gentry and Bryan Parno "Non-interactive verifiable computing: outsourcing computation to untrusted workers", CRYPTO, 2010, LNCS 6223, pp. 465-482, International Association of Cryptologic Research.*

(Continued)

*Primary Examiner* — Catherine Thiaw
(74) *Attorney, Agent, or Firm* — Ryan, Mason & Lewis, LLP

(57) ABSTRACT

A message and an identifying parameter associated with the message are obtained. The message comprises a plurality of units. A plurality of one-unit message authentication codes is generated, wherein each one-unit message authentication code corresponds to a respective unit of the plurality of units of the message, and wherein each one-unit message authentication code is generated based on the identifying parameter associated with the message, a given one of the plurality of units, and the position of the given unit in the message. Verification of each unit of the message may then be efficiently performed inside a method of secure computation such as, by way of example only, a garbled circuit.

19 Claims, 3 Drawing Sheets

(56) References Cited

U.S. PATENT DOCUMENTS

| | | | |
|---|---|---|---|
| 7,103,025 B1* | 9/2006 | Choksi | H04L 1/1848 370/335 |
| 8,443,205 B2 | 5/2013 | Kolesnikov et al. | |
| 8,488,791 B2 | 7/2013 | Baechler et al. | |
| 8,635,452 B2 | 1/2014 | Murray et al. | |
| 8,949,600 B2* | 2/2015 | Paddon | H04L 9/3242 380/37 |
| 2002/0051537 A1 | 5/2002 | Rogaway | |
| 2004/0001595 A1* | 1/2004 | Hopkins | H04L 9/088 380/277 |
| 2004/0170175 A1* | 9/2004 | Frank | H04L 12/24 370/392 |
| 2004/0193876 A1* | 9/2004 | Donley | H04L 1/1607 713/162 |
| 2005/0138374 A1* | 6/2005 | Zheng | H04L 9/0894 713/166 |
| 2005/0235145 A1* | 10/2005 | Slick | H04L 63/0428 713/165 |
| 2006/0080742 A1* | 4/2006 | Nakayama | G06F 21/10 726/27 |
| 2008/0104397 A1 | 5/2008 | Paddon et al. | |
| 2008/0170686 A1* | 7/2008 | Nemoto | H04L 9/0637 380/42 |
| 2009/0138708 A1* | 5/2009 | Miyazaki | H04L 63/12 713/168 |
| 2009/0175443 A1 | 7/2009 | Kolesnikov et al. | |
| 2011/0153995 A1* | 6/2011 | Byun | G06F 9/30014 712/221 |
| 2011/0296275 A1* | 12/2011 | Kishigami | H04L 1/0003 714/755 |
| 2012/0070000 A1 | 3/2012 | Baechler et al. | |
| 2012/0079602 A1 | 3/2012 | Kolesnikov et al. | |
| 2013/0195266 A1 | 8/2013 | Fischer | |
| 2013/0254557 A1 | 9/2013 | Garay et al. | |
| 2014/0108435 A1 | 4/2014 | Kolesnikov | |
| 2015/0270968 A1* | 9/2015 | Nairn | H04L 9/32 713/181 |

OTHER PUBLICATIONS

M. Bellare et al., "Foundations of Garbled Circuits," ACM Conference on Computer and Communications Security (CCS), Oct. 2012, 45 pages.

V. Kolesnikov et al., "Improved Garbled Circuit: Free XOR Gates and Applications," 35th International Colloquium on Automata, Languages and Programming (ICALP), Part II, Lecture Notes in Computer Science (LNCS), Jul. 2008, pp. 486-498. vol. 5126, Reykjavik, Iceland.

A.C. Yao, "Protocols for Secure Computations," SFCS Proceedings of the 23rd Annual Symposium on Foundations of Computer Science, IEEE Computer Society,1982, pp. 160-164, Washington, DC, USA.

* cited by examiner

US 9,509,665 B2

PROTECTING AGAINST MALICIOUS MODIFICATION IN CRYPTOGRAPHIC OPERATIONS

STATEMENT REGARDING GOVERNMENT RIGHTS

Inventions described herein were made with Government support under Contract No. D11PC20194 awarded by Intelligence Advanced Research Projects Activity (IARPA) via Department of Interior/National Business Center (DOI/NBC). The Government has certain rights in the inventions.

FIELD

The application relates generally to cryptography and, more particularly, to techniques for protecting against malicious modification in cryptographic operations.

BACKGROUND

This section introduces aspects that may be helpful to facilitating a better understanding of the inventions. Accordingly, the statements of this section are to be read in this light and are not to be understood as admissions about what is in the prior art or what is not in the prior art.

XOR encryption, also known as Shannon encryption, is one of the simplest forms of encryption widely used in cryptography. It is also highly efficient to implement. To encrypt a message m using a key k, a system or device simply computes c=m(xor)k, where (xor) represents a binary exclusive-OR operator. While there exist other very efficient encryption schemes, such as the Advanced Encryption Standard (AES), XOR encryption may be especially applicable to the application of garbled-circuit (GC)-based secure computations. Such applications, however, can be susceptible to malicious modification.

SUMMARY

Illustrative embodiments provide techniques for protecting cryptographic operations, such as but not limited to XOR encryption operations, from malicious modification.

For example, in one embodiment, a method comprises the following steps. A message and an identifying parameter associated with the message are obtained. The message comprises a plurality of units. A plurality of one-unit message authentication codes is generated, wherein each one-unit message authentication code corresponds to a respective unit of the plurality of units of the message, and wherein each one-unit message authentication code is generated based on the identifying parameter associated with the message, a given one of the plurality of units, and the position of the given unit in the message.

In one example, the message may be an XOR encryption key and the identifying parameter may be a unique identifier associated with the key. A message authentication code key is used to generate the plurality of one-unit message authentication codes. In the XOR encryption key example, a unit may be a bit thus resulting in the generation of a plurality of one-bit message authentication codes. Verification of each bit of the XOR encryption key may then be efficiently performed inside a method of secure computation such as, by way of example only, a GC.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor configured to perform steps of the above-described method.

Advantageously, in a GC-based secure computation application, generation of a one-bit message authentication code for each bit of an XOR encryption key can be used to efficiently verify the authenticity of the key to the GC, thus preventing against malicious modification of the XOR encryption key. Furthermore, illustrative embodiments provide for verifying, at a verifier associated with a private database system, the validity of a given bit of a set of bits, while preventing the verified bit from being known to the verifier.

These and other features and advantages of embodiments described herein will become more apparent from the accompanying drawings and the following detailed description.

DETAILED DESCRIPTION

Figure 1:
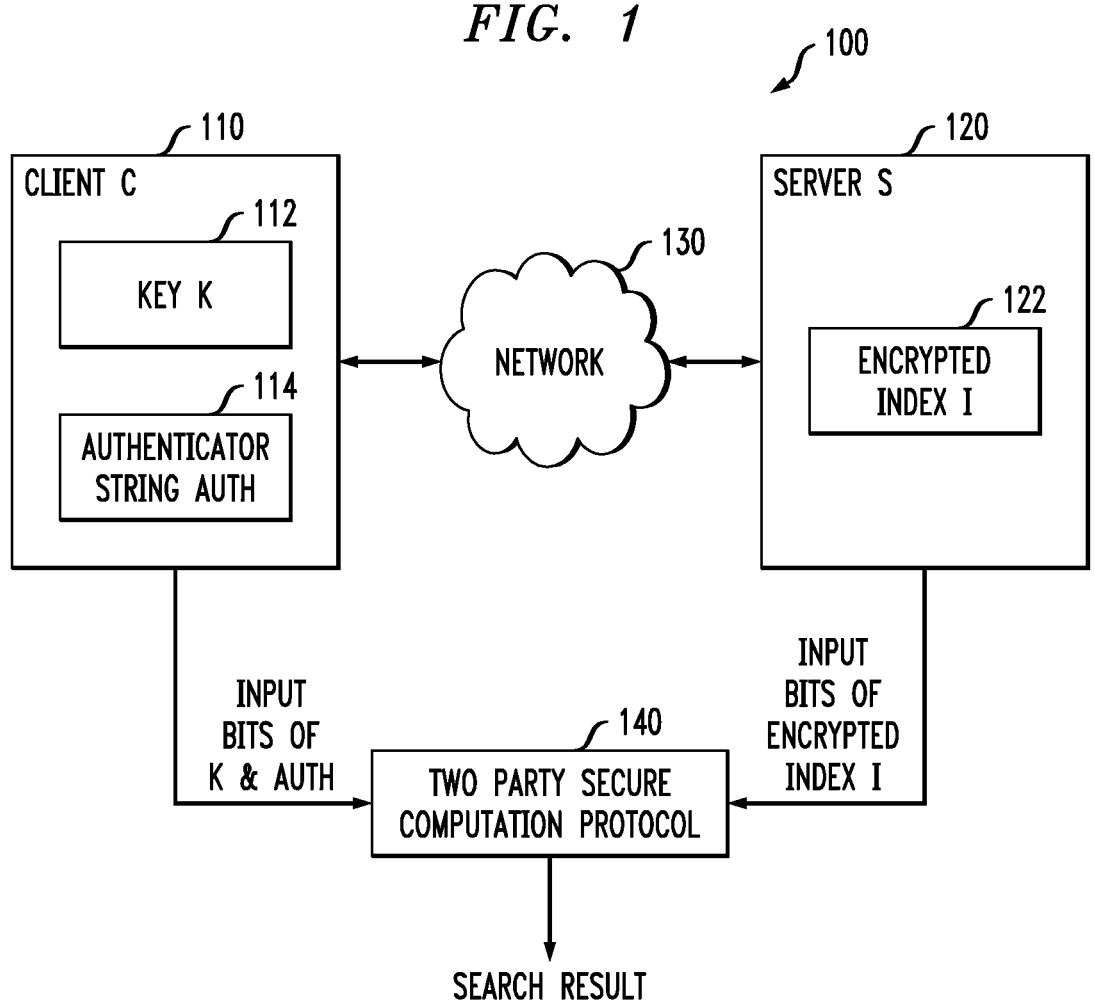
FIG. 1 illustrates a private database system with protected XOR encryption according to one embodiment.

Illustrative embodiments will be described herein with reference to exemplary computing systems, data storage systems, database systems, communication networks, processing platforms, systems, user devices, network nodes, network elements, clients, servers, and associated communication protocols. For example, illustrative embodiments are particularly well-suited for use with and/or in applications that utilize garbled circuit (GC)-based secure computations or operations. However, it should be understood that embodiments are not limited to use with the particular arrangements described, but are instead more generally applicable to any environment in which it is desirable to provide techniques for protecting cryptographic operations, e.g., XOR encryption, from malicious modifications.

In GC-based computations, generally, a function to be evaluated is represented as a Boolean circuit comprised of one or more logic gates, wherein input and output terminals of the gates are referred to as wires. Random (garbled) input values are assigned to each wire associated with each gate. A garbled table is then constructed, such that, given the assigned garbled input value of each input wire of the circuit, a corresponding garbled output value is computed for each output wire of the circuit. The circuit, and hence the function, is evaluated by constructing such garbled tables for each circuit gate. In a GC-based secure application, a garbled circuit is evaluated based on encrypted input data. Example uses of GC-based secure computations include, but are not limited to, secure database searching implemented as part of a so-called "private database system." A private database system is able to evaluate a function based on input values while maintaining the privacy of the input values.

Accordingly, in a private DB search, since a GC is executed on encrypted data, encryption has to be removed inside the GC. This removal task has minimal cost when using XOR encryption. However, when using all other popular encryption schemes (e.g., AES), the removal task can incur prohibitive cost.

However, one issue with XOR encryption is that it is highly malleable (i.e., modifiable). In particular, without knowing the message, a party (e.g., adversary) who holds the encryption key can flip bits of the message simply by flipping the corresponding bits of the secret key (i.e., flipping bits means changing a logic 0 bit value to a logic 1 bit value, or vice versa). When done by an adversary, this bit-flipping is referred to as "malicious modification."

Another issue with XOR encryption in certain private database systems is that the messages and keys can be very large, e.g., 50-100 GigaBytes (GB). As such, the system cannot afford significant increases of the key or the message (e.g., since extra storage would be needed to store auxiliary authenticating information).

Embodiments provide solutions to resolve the above and other issues by efficiently authenticating the encryption key.

Existing solutions, such as constructing a message authentication code (MAC) for a key k, focus mainly on ensuring that the entire key is completely correct and any change in the key is detected with very high probability. This results in at least two drawbacks:
1) The efficiency of existing solutions is poor in terms of the circuit complexity (and hence the very high cost associated with resulting secure computations in a private database setting).
2) Existing solutions do not allow for the fact that when the message and keys are very long, one could do away with solutions that allow for a small probability (e.g., 0.5) of detecting an adversarial key owner on a per bit-of-the-key basis. If a key owner tries to change too many bits of the key, the key owner will be caught with a significant probability, but may go undetected if changing only a few bits. In many applications, changing only a few bits does not affect the overall outcome, as is the case in the private database setting.

Some embodiments overcome these and other drawbacks by generating a separate message authentication code (MAC) for each bit of the encryption key k, as opposed to generating one MAC for the entire key k. In the private database application, each message has a unique identifier, i.e., msg-id. In this embodiment, the msg-ID is a unique identifier (identifying parameter) associated with the encryption key k since the "message" for which the MACs are generated is the encryption key itself. Thus, a separate MAC is generated using a MAC key, the message ID, the bit position, and the key bit. This MAC may be given to a verifier that can ensure that the encryption key bit is being correctly used.

It is to be appreciated that in such embodiments because the resulting MAC is very short (e.g., one bit), the storage space of the MAC prover is not very large and is acceptable (note that the verifier has the MAC key and can generate the MAC itself for verification). Further, the verification (which may be done inside the GC in the private database application) is extremely efficient.

FIG. 1 illustrates an example of a private database system with protected XOR encryption according to one embodiment. It is to be appreciated, however, that while cryptographic operation protection techniques described herein are particularly well-suited for providing protected XOR encryption in a private database system, one or more of said techniques may be alternatively implemented with other cryptographic operations and/or with other applications and systems.

As shown, a private database system 100 comprises a client (C) 110 and a server (S) 120 connected via a network 130. The client 110 and server 120 provide inputs to a two party secure computation protocol 140. The two party secure computation protocol 140 may be implemented as its own separate module that is connected to the network 130 and/or directly to one or both of the client 110 and the server 120. Part or all of the functions of the two party secure computation protocol can alternatively be implemented on the client 110, the server 120, or some combination thereof. A well-known two party secure computation protocol can be employed for protocol 140, by way of example only, the Yao Garbled Circuit protocol described in A. Yao, "Protocols for Secure Computations," Proceedings of FOCS, pp. 160-164, 1982. Another example of a two party secure computation protocol that can be employed for protocol 140 may be one or more of the secure two party computation methodologies described in U.S. Pat. No. 8,488,791 issued on Jul. 16, 2013 to G. Baechler and V. Y. Kolesnikov, and entitled "Securing Two-Party Computation Against Malicious Adversaries."

Whether the protocol 140 is the protocol of U.S. Pat. No. 8,488,791 or any well-known existing two party secure communication protocol, the protocol 140 generates a computation output, while keeping the inputs private. In this example of a private database system 100, the computation is an encrypted database search, and the inputs are a key (k) 112, or parts of it, and an authenticator string (Auth) 114 from the client 110, and an encrypted index (I) 122 from the server 120, or parts of it (note that the key encrypting the entire index may be very large, and the application may desire only bits corresponding to the bits with which it is working). These inputs will be further explained below in the context of FIG. 2.

It is to be appreciated that alternative embodiments can be implemented where one party is less trusted (client in the private database example), and whose input (e.g., encryption key, one-time pad entry, etc.) should be verified, and where the consequence of circumventing the protection is minimal. For example, in the private database example, a Bloom Filter can be used to perform a search, and the client would actually have to cheat (i.e., flip bits) many times in a row to be successful, which is not likely to happen.

Figure 2:
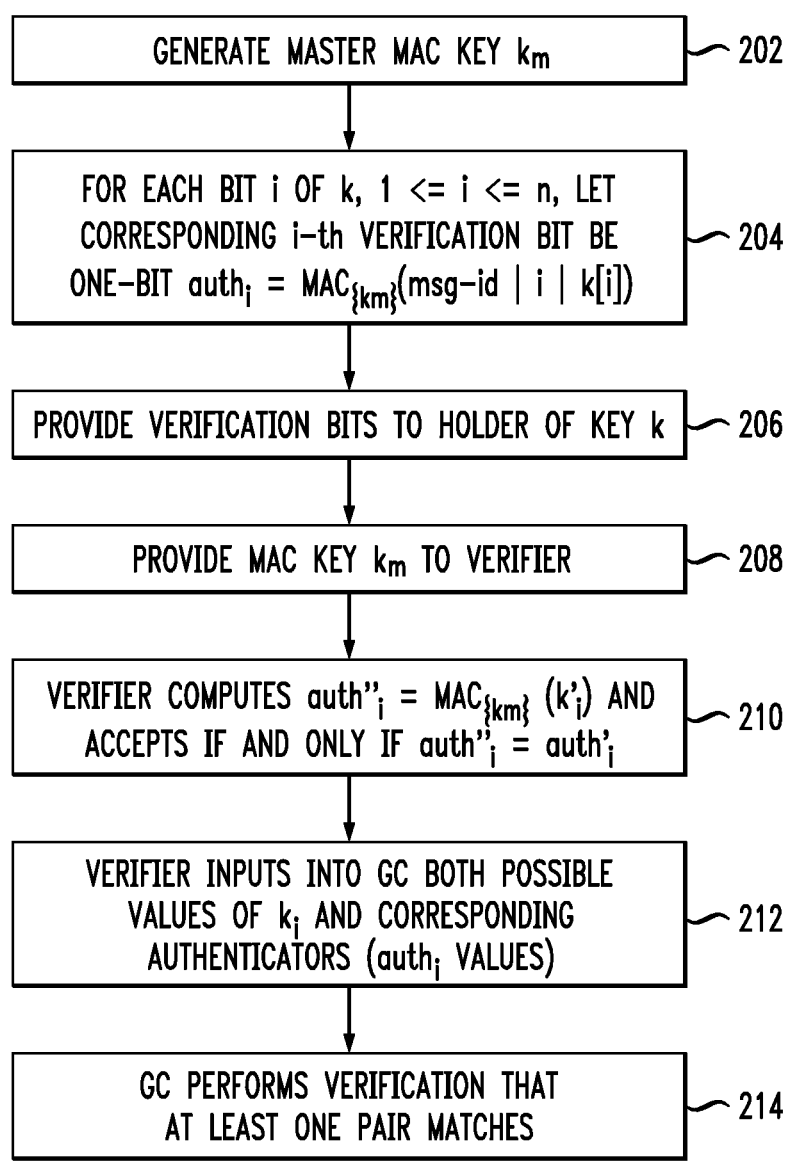
FIG. 2 illustrates a methodology for protecting XOR encryption according to one embodiment.

FIG. 2 illustrates a methodology for protecting XOR encryption according to one embodiment. The methodology 200 in FIG. 2 generates a separate one-bit message authentication code (MAC) for each bit of the encryption key k used to perform XOR encryption. Among other advantages, the methodology ensures the correct usage of decryption keys. Further, the parties illustratively referred to below, i.e., "key holder" and "verifier," may respectively be client 110 and the module that implements the two party secure computation protocol 140 in FIG. 1. Alternatively, one or more other parties (shown or not shown in FIG. 1) can perform the functions of key holder and/or verifier.

Let msg-id be some identifying parameter of a message (i.e., the XOR encryption key, in this embodiment).

Let k denote the XOR encryption key used (i.e., the XOR mask).

Let the number of bits in k be n.

Let MAC be any one-bit message authentication code (MAC). While a one-bit MAC can conceivably be forged with probability of 0.5, this probability of forgery is acceptable in certain applications, e.g., the private database application illustratively described herein.

By way of example only, a one-bit MAC can be obtained by computing an arbitrary MAC and applying a cryptographic hash function (by way of example only, SHA-256)

on the output of the MAC, and taking the last bit of the output of the hash function. Also, in an AES-based MAC, any bit of the output can be taken, by way of example only, the last bit.

Thus, given a key k, methodology 200 is executed as follows:

Step 202: Generate a master MAC key $k_m$.

Step 204: For each bit i of k, $1<=i<=n$, let the corresponding i-th verification bit be a one-bit $auth_i=MAC_{\{km\}}(msg\text{-}id|i|k[i])$ Step 206: Provide verification bits to a holder of the key k. Note that, in one embodiment, the client receives these verification bits and can later play the role of the prover, using these bits, to prove that the corresponding bits of k are authentic.

Step 208: Provide the MAC key $k_m$ to any party who would like to verify submitted bits of k (i.e., the verifier).

Step 210: When the party holding the key k (i.e., key holder) submits (possibly changed) bit $k'_i$, the party will also submit with it a (possibly changed) bit $auth'_i$. The verifier computes $auth''_i=MAC_{\{km\}}(k'_i)$ and accepts (provides indication of successful verification to the system) if and only if $auth''_i=auth'_i$. Note that $k'_i$ thus purports to be $k_i$.

Step 212: If the verifier is not allowed to learn $k'_i$ (as in the illustrative private database system setting) and the evaluation is done inside a GC, then the verifier inputs into the GC both possible values of $k_i$ and corresponding authenticators ($auth_i$ values).

Step 214: Then, inside the GC, a verification operation is performed to determine that at least one pair matches. Verification computation can be implemented as a subroutine in the secure computation performed using the GC as the underlying technique. Specifically, the secure computation outputs 'accept' if the pair <key bit, auth bit> provided by prover (e.g., client) matches one of the two possible pairs (i.e., $<0, auth_0>$, $<1, auth_1>$) provided by the verifier (e.g., server can host the verification operation and therefore be the verifier).

Observe that if the key holder is honest (i.e., not an adversary), then $k''_i=k_i$. Otherwise, if either $k'_i$ or $auth'_i$ was modified (i.e., by an adversary), the output bit $k''_i$ is equal to $k_i$ with probability of 0.5. In particular, any attempt to change a particular bit of the key will result in an incorrect MAC with probability of 0.5.

Advantageously, illustrative embodiments facilitate an important feature in a private database system, i.e., efficiently verifying the validity of any bit of a long string, while allowing the verified bit to be hidden from the verifier. This is desirable since unauthorized string modifications may result in circumventing privacy guarantees in a private database system. Existing solutions are very costly in terms of time, e.g., on the order of one second as compared with the one-bit MAC approach described herein which is on the order of one millisecond.

It is to be understood that while illustrative embodiments described herein provide for generating a separate MAC for each bit of a message (e.g., XOR encryption key), alternative embodiments provide for generating a separate MAC for less than each bit of the message. For example, where a message includes N bits, a separate MAC can be generated for each of N-x of the bits, where x is a number of bits (e.g., 1, 2, 3, . . . ) for which a MAC would not be generated and such non-generation of MACs for those particular bits would not significantly impact one or more of the benefits of the cryptographic protection techniques described herein.

Furthermore, it is to be understood that while a bit is illustratively used herein as a minimum unit of measure for defining the length of a message (i.e., wherein a message is composed of a plurality of bits), a message may be more generally composed of a plurality of units, thus resulting in the generation of a respective plurality of one-unit MACs. One example of a unit, other than a bit, includes but is not limited to a multi-bit unit wherein the message comprises a plurality of such multi-bits units for which a respective plurality of MACs are generated (i.e., a separate MAC for each multi-bit unit of the message).

Figure 3:
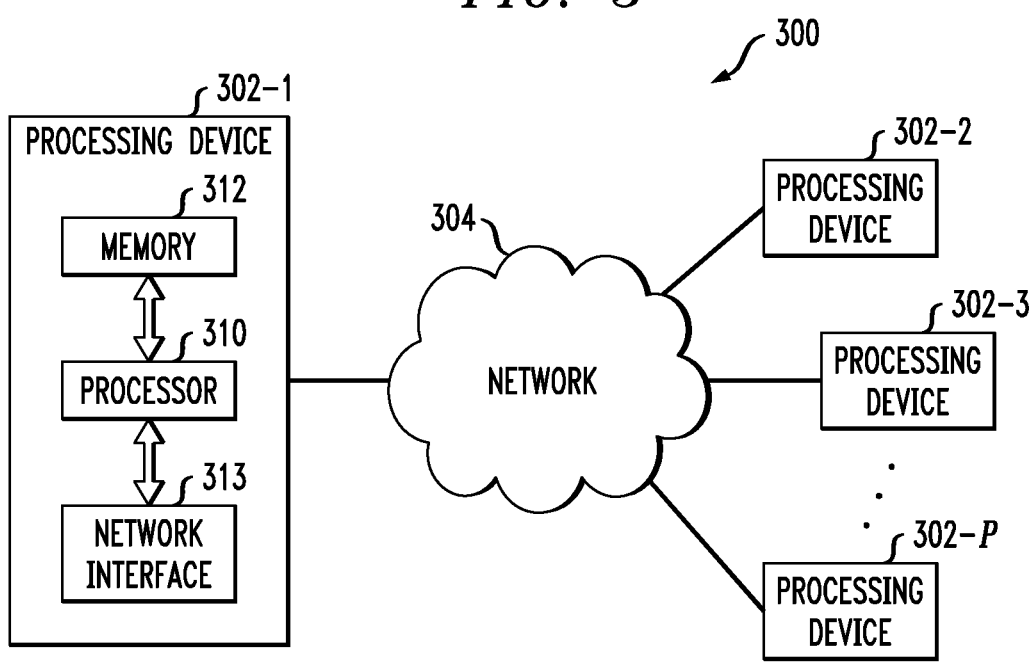
FIG. 3 illustrates a processing platform on which a system with protected XOR encryption is implemented according to one or more embodiments.

Turning now to FIG. 3, a processing platform is shown on which a system, e.g., a private database system, with protected XOR encryption (e.g., system 100 in FIG. 1 implementing methodology 200 in FIG. 2) is implemented according to one or more embodiments. The processing platform 300 in this embodiment comprises a plurality of processing devices denoted 302-1, 302-2, 302-3, . . . 302-P, which communicate with one another over a network 304. One or more of the components and/or modules of private database system 100 (e.g., client 110, server 120, protocol module 140, and various other modules not expressly shown) may therefore each run on one or more computers or other processing platform elements, each of which may be viewed as an example of what is more generally referred to herein as a "processing device." As illustrated in FIG. 3, such a device generally comprises at least one processor and an associated memory, and implements one or more functional modules for instantiating and/or controlling features of systems and methodologies described herein. Multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random access memory (RAM), read-only memory (ROM) or other types of memory, in any combination. The one or more software programs when executed by a processing device such as the processing device 302-1 causes the device to perform functions associated with one or more of the components/steps of system 100 and methodology 200. One skilled in the art would be readily able to implement such software given the teachings provided herein. Other examples of processor-readable storage media embodying embodiments may include, for example, optical or magnetic disks.

Also included in the processing device 302-1 is network interface circuitry 314, which is used to interface the processing device with the network 304 and other system components. Such circuitry may comprise conventional transceivers of a type well known in the art.

The other processing devices 302 of the processing platform 300 are assumed to be configured in a manner similar to that shown for processing device 302-1 in the figure.

The processing platform 300 shown in FIG. 3 may comprise additional known components such as batch processing systems, parallel processing systems, physical machines, virtual machines, virtual switches, storage volumes, logical units, etc. Again, the particular processing platform shown in FIG. 3 is presented by way of example only, and private database system 100 of FIG. 1 may include additional or alternative processing platforms, as well as numerous distinct processing platforms in any combination.

Also, numerous other arrangements of clients, servers, computers, storage devices or other components are possible. Such components can communicate with other elements of the system over any type of network (e.g., network 130 in FIG. 1 and/or network 304 in FIG. 3), such as a wide area network (WAN), a local area network (LAN), a satellite network, a telephone or cable network, a storage network, a converged network or various portions or combinations of these and other types of networks.

Although certain illustrative embodiments are described herein in the context of systems and networks utilizing particular communication protocols, other types of systems and networks can be used in other embodiments. As noted above, the terms "system" and "network" as used herein are therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing protected cryptographic (e.g., XOR encryption) functionality. The particular manner in which network nodes communicate can be varied in other embodiments. Also, it should be understood that the particular assumptions made in the context of describing the illustrative embodiments should not be construed as requirements of the inventions. The inventions can be implemented in other embodiments in which these particular assumptions do not apply. These and numerous other alternative embodiments within the scope of the appended claims will be readily apparent to those skilled in the art.

What is claimed is:

1. A method, comprising:
    obtaining a message and an identifying parameter associated with the message, wherein the message comprises a plurality of units;
    generating a plurality of one-unit message authentication codes, each one-unit message authentication code corresponding to a respective unit of the plurality of units of the message, wherein each one-unit message authentication code is generated based on the identifying parameter associated with the message, a given one of the plurality of units, and the position of the given unit in the message; and
    providing two or more possible combinations of values of a first one of the one-unit message authentication codes and a corresponding first authenticator string as inputs to a garbled-circuit based secure computation protocol, wherein the garbled circuit-based secure computation protocol outputs an indication of the validity of the first one-unit message authentication code;
    wherein the method is performed by at least one processing device; and
    wherein the message comprises an encryption key.

2. The method of claim 1, wherein the encryption key comprises an XOR encryption key.

3. The method of claim 1, wherein the message comprises a plurality of bits, and each unit of said plurality of units consists of a single bit such that each of a plurality of one-bit message authentication codes is respectively generated for each of the plurality of bits of the message.

4. The method of claim 1, wherein the plurality of one-unit message authentication codes is respectively generated for the plurality of units of the message using a message authentication code key.

5. The method of claim 4, further comprising providing the plurality of one-unit message authentication codes to a holder of the message.

6. The method of claim 5, further comprising providing the message authentication code key to a verifier such that the verifier can verify the authenticity of a message which purports to be the message and which the verifier subsequently receives along with the plurality of one-unit message authentication codes.

7. The method of claim 6, wherein the purported message and the plurality of one-unit message authentication codes are provided to the garbled-circuit based secure computation protocol to perform the verification of authenticity of the purported message without revealing the content of the purported message to the verifier.

8. The method of claim 1, wherein the garbled circuit-based secure computation protocol is part of a private database system.

9. An article of manufacture comprising a processor-readable storage medium having embodied therein executable program code that when executed by the processing device causes the processing device to perform steps of claim 1.

10. A method, comprising:
    receiving, at a verifier associated with a private database system, a given one of a plurality of one-unit message authentication codes and a corresponding authenticator string, the given one-unit message authentication code corresponding to a respective unit of a plurality of units of a message, wherein the given one-unit message authentication code is generated based on an identifying parameter associated with the message, a given one of the plurality of units, and a position of the given unit in the message; and
    verifying, at the verifier, the validity of the given one-unit message authentication code, while preventing content of the message from being known to the verifier;
    wherein the verifying step is performed by a processing device which implements the verifier as part of the private database system and comprises inputting into a garbled circuit-based secure computation protocol two or more possible combinations of values of the given one-unit message authentication code and corresponding authenticator string and receiving an output from the garbled circuit-based secure computation protocol indicating the validity of the first one-unit message authentication code; and
    wherein the message comprises an encryption key.

11. The method of claim 10, wherein the encryption key comprises an XOR encryption key.

12. An apparatus comprising:
    a memory; and
    a processor operatively coupled to the memory and configured to:
    obtain a message and an identifying parameter associated with the message, wherein the message comprises a plurality of units;
    generate a plurality of one-unit message authentication codes, each one-unit message authentication code corresponding to a respective unit of the plurality of units of the message, wherein each one-unit message authentication code is generated based on the identifying parameter associated with the message, a given one of the plurality of units, and the position of the given unit in the message; and providing two or more possible combinations of values of a first one of the one-unit message authentication codes and a corresponding first authenticator string as inputs to a garbled-circuit based secure computation protocol, wherein the garbled circuit-based secure computation protocol outputs an indication of the validity of the first one-unit message authentication code;

wherein the message comprises an encryption key.

13. The apparatus of claim 12, wherein the encryption key comprises an XOR encryption key.

14. The apparatus of claim 12, wherein the message comprises a plurality of bits, and each unit of said plurality of units consists of a single bit such that each of a plurality of one-bit message authentication codes is respectively generated for each of the plurality of bits of the message.

15. The apparatus of claim 12, wherein the plurality of one-unit message authentication codes is respectively generated for the plurality of units of the message using a message authentication code key.

16. The apparatus of claim 15, wherein the processor is further configured to provide the plurality of one-unit message authentication codes to a holder of the message.

17. The apparatus of claim 16, wherein the processor is further configured to provide the message authentication code key to a verifier such that the verifier can verify the authenticity of a message which purports to be the message and which the verifier subsequently receives along with the plurality of one-unit message authentication codes.

18. The apparatus of claim 17, wherein the purported message and the plurality of one-unit message authentication codes are provided to the garbled-circuit based secure computation protocol to perform the verification of authenticity of the purported message without revealing the content of the purported message to the verifier.

19. The apparatus of claim 12, wherein the garbled circuit-based secure computation protocol is part of a private database system.

* * * * *